3,091,511
PROCESS OF DEODORIZING
Edward J. Calhoun, Lake Success, N.Y., assignor to Pharmaceutical Food & Drugs Associates, Inc., New York, N.Y., a corporation of New York
No Drawing. Filed Oct. 9, 1961, Ser. No. 143,532
3 Claims. (Cl. 21—55)

The present invention relates to a process of removing or repressing undesirable odors and particularly to an improved method of deodorizing offensive and obnoxious odors arising from any source.

It is well-known that many agents can be employed as deodorants. For example, chlorophyll and various aromatic compounds are utilized as the basic agents in liquid gargles, tablets, or lozenges for removing or suppressing malodors arising from the mouth or the gastrointestinal tract. In industrial applications, numerous clays, activated carbon or charcoals and chemical compounds are used for deodorizing liquids of various types having an undesirable or offensive odor. Such liquids are passed through beds of such clays, charcoal, and chemical compounds, such as, for example, magnesium sulfate, insoluble aluminum salts, and the like, to partially or substantially deodorize the same.

It is the principal object of the present invention to provide an improved method of removing or repressing undesirable odors emanating from any source.

Other objects and advantages will become more clearly apparent from the following description.

I have discovered that the salicylic acid esters of phenol and p-acetylaminophenol are excellent deodorizing agents and are effectively employed as the base materials for a large class of deodorizing compositions for the removal or repression of undesirable odors. In other words, phenyl salicylate and the salicylic acid ester of p-acetylaminophenol are potent deodorizing agents and employed as such or in combination with inert fillers as the carrying medium and utilized for all types of deodorizing processes. Both of these esters are soluble in alcohol, ether, acetone, and many other liquid organic compounds and oils. The solutions of the esters may be employed for impregnating various inert carriers such as clays, e.g., kieselguhr, kaolin, diatomaceous earth and clays of various types employed in the chemical processing industries, including glass wool, animal and vegetable fibers, synthetic fibers, silica gel, and the like. In addition, the esters may be employed in aerosol foot spray compositions, anti-perspirants, mist deodorants, space deodorants, aerosol deodorant powder compositions, and the like.

The following examples will serve to illustrate certain ways in which the process of my invention is applied.

*Example 1*

Six grams of phenyl salicylate were dissolved in 10 grams of anhydrous ethyl alcohol, to which were added 0.4 gram of U.S.P. menthol and 0.1 gram of a perfume oil. The resulting solution was chilled and charged in the conventional aerosol loading manner with 83.5 grams of an equal mixture of Freon propellants 11 and 12. The loaded aerosol can containing the compostion was applied to perspired feet of a human being and within 15 seconds the malodor emanating from the feet was completely repressed.

*Example 2*

Five grams of the salicylic acid ester of p-acetylaminophenol were dissolved in 30 grams of ethyl alcohol. To 5 grams of the resulting solution a few drops of a perfume oil, together with 4.5 grams of dipropylene glycol and 0.5 gram of tartaric acid were added. The resulting solution was filtered and then diluted with 80 grams of anhydrous ethyl alcohol. Seventy percent by weight of the diluted solution was drilled and loaded in the conventional manner with 30% by weight of a mixture of Freons consisting of 60 parts of Freon 114 and 40 parts of Freon 12. The resulting composition was employed as an anti-perspirant under the arms of a human being and found to repress the odor within a matter of seconds. The application of the anti-perspirant effect after a bath remained for a period of about twenty-four hours.

*Example 3*

The following composition may be employed as a deodorant mixture aerosol in the removal of bad odors from confined quarters, such as in a room reeking with cigar, cigarette, or pipe smoke:

| | Grams |
|---|---|
| Phenyl salicylate | 2 |
| Anhydrous ethyl alcohol | 12 |
| Synthetic violet perfume oil | .2 |
| An equal mixture of Freon propellants 11 and 12 | 84 |

A precision 0.013 valve for the spray head of the loaded aerosol container was employed. When the composition was sprayed into a room filled with cigar smoke, the odor was repressed within a matter of two minutes.

*Example 4*

The following composition is effectively employed as an aerosol deodorant powder:

| | Grams |
|---|---|
| Salicylic acid ester of p-acetylaminophenol | .25 |
| Synthetic lilac perfume oil | .25 |
| Anhydrous ethanol | 3 |
| U.S.P. talc, 325 mesh | 96.5 |

Fifteen parts by weight of the above composition were loaded in the conventional aerosol manner with 85 parts by weight of a propellant mixture consisting of 65 parts by weight of Freon 11 and 35 parts by weight of Freon 12. Prior to the use, the aerosol composition is well shaken and then applied as a deodorant under the armpits or on cats and dogs, while protecting their eyes. The spray deodorant powder effectively removes malodors.

*Example 5*

Ten grams of phenyl salicylate were dissolved in 60 grams of methyl alcohol and the resulting solution employed to impregnate 1000 grams of silica gel beads. In this operation the alcohol solution was sprayed upon the beads from an air atomizer while constantly mixing the beads. The sprayed silica gel beads were then allowed to remain at room temperature for a period of ½ hour so as to allow the evaporation of the methanol. The treated and dried silica gel beads were then placed in a fine mesh wire container having a dimensional size of 20" by 10" by 1" and placed as a window screen in a room in which two other windows were completely closed. On the outside of the room hydrogen sulfide was generated and wafted toward the screen. The person inside the room and in close proximity to the screen just barely percepted the odor of hydrogen sulfide.

*Example 6*

An alcohol solution of phenyl salicylate was prepared as in Example 5 and employed in impregnating 1000 grams of kaolin. The impregnated kaolin was spread out in shallow pans to permit the evaporation of the alcohol. The dried kaolin was then employed as a filter bed for filtering a 1% aqueous solution of butyric acid. The resulting filtrate was free from the unpleasant rancid odor.

Example 7

A granulation suitable for further working up into tablets was prepared from the following components:

| | Grams |
|---|---|
| Phenyl salicylate | 71.45 |
| Aluminum hydroxide gel (dry) | 24.55 |
| Polyvinyl pyrrolidone having a K value of 60 | 4 |
| Ethyl alcohol | 400 |

The phenyl salicylate and the aluminum hydroxide gel were charged into a mixer and thoroughly mixed with the addition of the polyvinyl pyrrolidone in alcohol until the mixture was massed. The resulting mass was then passed into a conventional rotary granulator and then granulation dried at about 120° F. A conventional lubricant was then blended with the granulation and hard tablets of 1 gram size compressed therefrom. The resulting tablets are exceptionally useful as deodorizing agents. In other words, the tablets may be placed in various types of containers having openings such as wire cages, rectangular thin aluminum boxes with perforations for holding the tablets, and such cages and boxes utilized as filter mediums for windows, in air conditioning apparatus, and the like.

In addition to the foregoing industrial applications, I have discovered that the esters employed in accordance with the present invention are considerably more effective than chlorophyll in removing breath odors of all kinds, such as, for example, garlic, onion, whiskey, cigar smoke, halitosis, and the like. Two grams of either phenyl salicylate or the salicylic acid ester of p-acetylaminophenol may be dissolved in 100 grams of either a 50% or 75% aqueous ethanol solution and employed as a gargle to remove or substantially suppress the aforementioned malodors. Both of the esters may be employed in a concentration ranging from 1 to 2½% in an unctuous base and applied as a body deodorant.

The esters utilized in accordance with the present invention may be employed in solutions, i.e., in solvents in which they are soluble, and the resulting solutions employed for spraying various filtering media such as those employed in smoke stacks to remove or substantially repress the noxious odors. Such filters may also be employed in automobile and bus exhausts. In the latter case a carrier base such a silica gel, kaolin, etc., may be impregnated with a solution of the esters and the resulting impregnant employed in a replaceable filter for removal of noxious odors, as well as smog-producing materials and other products of incomplete combustion, including dusts, tars, resins, harmful chemicals, and the like.

The phenyl salicylate may be employed in combination with aluminum hydroxide for the preparation of lozenges or tablets and used internally as deodorants of the gastrointestinal tract, as well as the mouth. In such use I found that lozenges prepared from 2 grains of aluminum hydroxide and 5 grains of phenyl salicylate prepared according to the conventional manufacturing technique are exceptionally useful, when taken internally, in the removal or suppression of malodors arising from the gastrointestinal tract and due to garlic, onions, halitosis, etc.

From the foregoing illustrative examples it is clearly evident that both phenyl salicylate and the salicylic acid ester of p-acetylaminophenol are excellent deodorizing substances whether used in solution or in combination with an inert carrying medium. In other words, both of these esters may be employed as such in fine powdered form and sprinkled from a suitable dusting container upon malodorous garbage cans and receptacles of all types used for collecting and storing disposed refuse. Instead of employing these esters in powdered form, they may be employed in solution in the various organic solvents in which they are soluble and the resulting solutions applied in a concentration of 2 to 5% by weight of solid and the remainder solvent upon receptacles containing disposed refuse and other media that gives off an undesirable or offensive odor. Alcoholic solutions containing from 3 to 5% of any of the esters may be employed in atomizers as sprays for lavatories and barns in which domestic animals are housed. The esters may also be employed in a concentration of 5 to 10% in various inert fillers such as talcum, kieselguhr, clays, etc., and employed as dusting powders in any of the aforementioned applications.

I claim:

1. The process of deodorizing offensive odors arising from malodorous substances which comprises contacting the said malodorous substance with an ester selected from the class consisting of phenyl salicylate and the salicylic acid ester of p-acetylaminophenol.

2. The process of removing undesirable odors from offensive odor-producing substances which comprises contacting said substances with phenyl salicylate.

3. The process of removing undesirable odors from offensive odor-producing substances which comprises contacting said substances with the salicylic acid ester of p-acetylaminophenol.

References Cited in the file of this patent

UNITED STATES PATENTS 2,918,491     Radue     Dec. 22, 1959